United States Patent [19]
Rihm

[11] 4,093,263
[45] June 6, 1978

[54] SAFETY BICYCLE SEAT REFLECTOR

[76] Inventor: Peter L. Rihm, 642 N. Cherry St., Celina, Ohio 45822

[21] Appl. No.: 759,114

[22] Filed: Jan. 13, 1977

[51] Int. Cl.² .............................................. B62J 1/18
[52] U.S. Cl. ................... 280/289 R; 297/195; 350/97
[58] Field of Search ............... 280/289 R, 289 A; 350/97, 103, 105; 297/195, 214, DIG. 4; D6/48.1; 116/28 R

[56] References Cited

U.S. PATENT DOCUMENTS

| 2,057,374 | 10/1936 | Faulhaber | 297/195 X |
| 2,225,317 | 12/1940 | Mesinger | 297/214 |
| 2,320,421 | 6/1943 | Faulhaber | 297/214 X |
| 3,907,404 | 9/1975 | McEwin | 350/97 X |

FOREIGN PATENT DOCUMENTS

| 1,099,116 | 4/1955 | France | 350/97 |

Primary Examiner—Joseph F. Peters, Jr.
Assistant Examiner—Terrance L. Siemens
Attorney, Agent, or Firm—Laverne D. Geiger

[57] ABSTRACT

A bicycle safety reflector extends below the seat, covers the back of the seat and seat springs, and is secured to the seat cover or seat post thereby providing a large reflecting area making the bicycle clearly visible to operators of faster moving vehicles.

9 Claims, 5 Drawing Figures

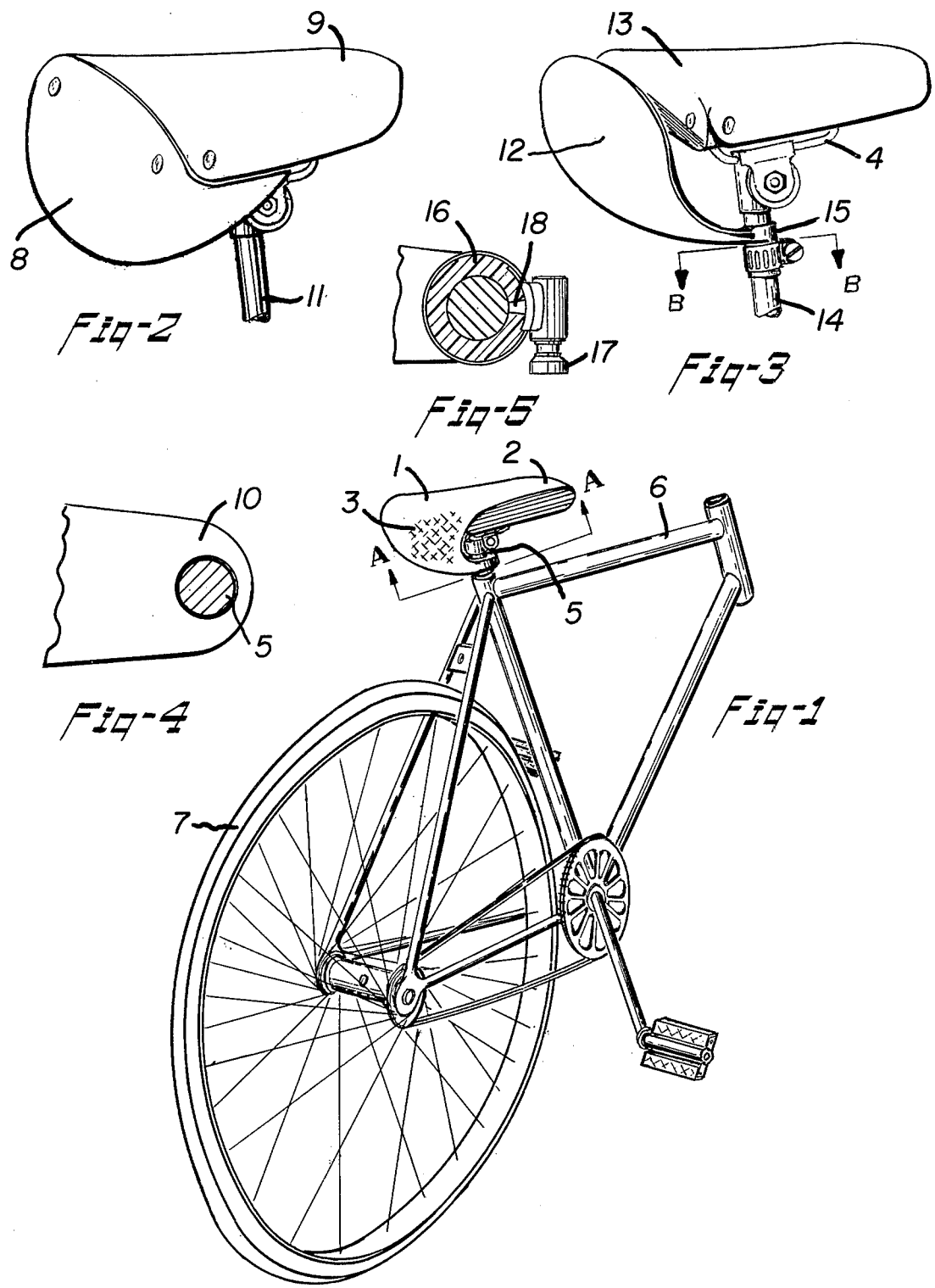

SAFETY BICYCLE SEAT REFLECTOR

BACKGROUND, SUMMARY AND OBJECTS OF THE INVENTION

Bicycle safety has become a national problem with the increasing number of motor vehicles and bicycles intermingling in the general traffic. Today's vehicular traffic on roads and highways involves not only large fast moving trucks, busses and automobiles, but also bicycles. The number of bicycles is rapidly increasing. Bicycles are small in comparison to the rest of the vehicles on the road and move at much slower speeds. Part of the problem lies in the poor visibility of the bicycle rider and the bicycle, and so they must be clearly and easily visible to operators of the rest of the vehicles. Experience dictates that, at present day speeds of motor vehicles, they be clearly identifiable at a distance of 500 or 600 feet both day and night. Some statutes make such identification mandatory. This suggests that the bicycle be provided with a reflecting, fluorescent or luminous area of sufficient size to provide such identification to anyone, including operators of other vehicles.

The present invention discloses a bicycle safety reflector which is secured to the seat and affords a simple and effective means for providing the necessary visibility to a bicycle to meet the practical and legal requirements. The reflector covers at least the back of the seat and the springs and extends downwardly and partially underneath the seat. It may be in the shape of a bib or may have any other attractive or useful shape. Since a portion of the reflector is directly behind the springs it may be of any desired width thereby allowing the necessary size for good visibility.

It is therefore an object of this invention to provide a reflecting, luminous or fluorescent bib for the seat of a bicycle.

It is a further object of this invention to provide a reflecting or luminous cover for the back and springs of a bicycle seat.

It is also an object of this invention to provide a bicycle seat with a cover of reflecting or luminous material.

It is another object of this invention to provide a bicycle seat with an integral reflector which may be installed by the seat manufacturer.

It is another object of this invention to provide a bicycle reflector to cover the back of the bicycle seat and springs and to be secured to the seat post.

DESCRIPTION OF THE DRAWING

FIG. 1 is a diagrammatic view of a bicycle seat and its support illustrating the reflector covering the back of the springs and integral with the seat cover and secured to the seat post.

FIG. 2 is a view of the bicycle reflector secured to the cover of the seat.

FIG. 3 is a view of a stiff bicycle reflector secured to the seat post and covering the back and springs of the seat.

FIG. 4 is a sectional view looking substantially along line A—A of FIG. 1.

FIG. 5 is a sectional view looking substantially along line B—B of FIG. 3.

DESCRIPTION OF PREFERRED EMBODIMENT OF THE INVENTION

In the preferred embodiment of the invention, illustrated in FIGS. 1 and 4, I have shown the reflector 1 integral with the seat cover 2 and depending downwardly below the back of the seat in the form of a reflector bib, tab or shield 3 to cover the springs and to provide a large reflecting surface. For the average bicycle the bib should be as wide as the seat where it joins the seat and should narrow downwardly. Thus it may have a variety of shapes. For example, the bib may have the shape of half of an ellipse or a triangle, as viewed from behind, or it may be pear-shaped. It may also be curved in the shape of an oval spoon. An effective height for good visibility and practical construction in a seat for adults has been found to be about 4½ inches but is in no way limited to this. A width of 6½ inches more or less is appropriate and provides a large reflecting area. The reflector bib 3 is thus an extension of the seat cover and may be made by the seat manufacturer during construction of the seat. The seat comprises springs 4, post 5 and cover 2, and in this respect is similar to most bicycle seats now in general use. FIG. 1 shows in diagrammatic form a portion of the bicycle frame 6 along with wheel 7 of the bicycle. Since bicycles are well known the rest of the bicycle has been omitted from the drawing. The particular material of the reflector bib 3 and seat cover 2 may be selected to suit the manufacturer. Suggested materials are plastic, rubber or leather. An effective and satisfactory color for the material is orange red. The material should have sufficient toughness and wearing qualities to serve as a seat cover and have necessary and sufficient reflective qualities to act as a reflector. The term "reflector" as used herein includes the terms "luminous" and "fluorescent" and although these are characteristics of the surface of the reflector it is preferred to use material having these characteristics throughout the material. A coated material could be used but the wearing qualities are increased if the reflective material is thicker than a mere coating. In the form of the invention shown in FIGS. 1 and 4 the seat cover 2 itself may also serve as a reflector. In this case the front and sides of the seat as well as the front and edges of the reflector bib 3 are reflective, luminous or fluorescent and all exposed portions of the material are visible to persons viewing the bicycle from the front and sides as well as from the rear.

Since safety is the paramount consideration in the use of this invention it is desirable to make the reflector a permanent part of the bicycle and difficult to remove. Since the reflector bib is integral with the seat cover 2 it is a part of the seat and is made and installed during the manufacture of the vehicle.

The specific size and shape of the reflector may vary somewhat depending upon the particular size of the seat. The bib, tab or shield 3 shown presents a pleasing contour and effectively covers the back of the seat and springs. It also presents a large reflecting area. It may approach a flat plane but a curved contour, as shown, is more desirable in order to avoid sharp edges. Likewise it is preferably to flare the sides and bottom edges inwardly slightly, as shown, in somewhat the shape of an oval spoon.

Although FIG. 1 shows the lower portion of the reflector bib 3 having an anchor 10, with a hole, that slips over the seat post and extends around the post, anchor 10 may be omitted and the lower end of the bib unsecured at the post so that the lower end of the bib would be free to move.

In FIG. 2 the reflector 8 is similar in appearance to reflector bib 3 but is manufactured separately and then secured to the cover 9. Any appropriate securing means may be used, as for example, sewing, bolts or rivets (as shown). It may be secured during the manufacture of the seat or it may be added later. The reflector is shown with its lower portion oval-shaped in appearance and without an anchor to the seat post. The material of reflector 8 is similar to that of reflector bib 3 described hereinabove.

Sometimes it is desirable to replace the reflector, and FIG. 3 and FIG. 5 show such replaceable reflector 12. From the rear of the bicycle, reflector 12 resembles in appearance reflectors 1 and 8. However, reflector 12 is not directly connected to seat cover 13. It extends upwardly to cover the back of the seat cover and the springs and is secured to the post 14 at 15. The upper portion of the reflector may stand away from the seat as much as three inches. Reflector 12 has similar reflective, luminous, or fluorescent properties to those of reflectors 1 and 8 but the material is somewhat more firm and is self-supporting. At the lower end it merges with the sleeve-like collar 15 which encircles the post 14. Collar 15 is split at 18 to permit the reflector to be attached to the seat post without removal of the post. Securing element 17 (shown as a band clamp) clamps clamp portions 16, 16 of the collar to the post to firmly hold the reflector. Since this form of the reflector is made to be clamped to post 14 it may likewise be clamped to any tubular or cylindrical element of the bicycle. Thus its curved side may face in any desired direction to enhance the visibility of the bicycle from such desired direction.

I claim:

1. In combination with a bicycle having a seat which includes a seat cover, springs and a post: a safety bicycle reflector secured directly to the seat and covering the back and springs of the seat, said reflector being in the form and the shape of a bib and comprising a material presenting a reflective surface on all sides and edges and in which the lower portion of the reflector extends forwardly beyond the seat post, said reflector having a securing opening in its forward lower portion for receiving the bicycle post to secure the reflector to the seat post.

2. In combination with a bicycle having a seat which includes a seat cover, springs and a post: a safety bicycle reflector secured directly to the seat and covering the back and springs of the seat, said reflector being in the form and the shape of a bib and comprising a material presenting a reflective surface on all sides and edges and in which the material of the reflector is substantially uniformly reflective throughout and in which the side edges and the top and bottom edges are flared inwardly toward the seat.

3. A safety bicycle reflector as recited in claim 2 in which the reflector is integral with the seat cover.

4. A safety bicycle reflector as recited in claim 3 in which the lower portion of the reflector extends forwardly beyond the seat post, said reflector having a securing opening in its lower forward portion for receiving the bicycle post to further secure the reflector to the bicycle seat.

5. A safety bicycle reflector as recited in claim 2 in which the reflector has a securing means near the top for securing it to the seat cover.

6. A safety bicycle reflector as recited in claim 5 in which the lower portion of the reflector extends forwardly beyond the seat post, said reflector having a securing opening in its forward lower portion for receiving the bicycle post to further secure the reflector to the bicycle seat.

7. In combination with a bicycle having a seat which includes a seat cover, springs and a post: a safety bicycle reflector secured directly to the seat and covering the back and springs of the seat, said reflector being in the form and the shape of a bib and comprising a material presenting a reflective surface on all sides and edges and in which the material is firm and the reflector is self supporting, said reflector having a sleeve-like portion at its lower forward end encircling said post thereby securing said reflector to the seat.

8. A safety bicycle reflector as recited in claim 7 in which the sleeve-like portion is split longitudinally to permit the reflector to be secured to the post without removing the post from the bicycle, and a securing element to clamp said sleeve-like portion around said post.

9. A safety bicycle reflector as recited in claim 8 in which the material of the reflector is substantially uniformly reflective throughout and in which the side edges and the top and bottom edges are flared inwardly toward the seat.

* * * * *